United States Patent [19]

Cloud et al.

[11] Patent Number: 5,497,858
[45] Date of Patent: Mar. 12, 1996

[54] DYNAMIC MOTION LIMITER

[75] Inventors: Robert L. Cloud, Berkeley; James S. M. Leung, Vacaville; Jason W. Dunham, San Francisco, all of Calif.

[73] Assignee: Robert L. Cloud & Associates, Inc., Berkeley, Calif.

[21] Appl. No.: 927,118

[22] Filed: Aug. 7, 1992

[51] Int. Cl.⁶ .................................................... F16M 1/00
[52] U.S. Cl. ............................ 188/67; 267/138; 267/139
[58] Field of Search ............................ 188/67; 74/162; 92/15, 23, 26; 267/135–139; 248/562

[56] References Cited

U.S. PATENT DOCUMENTS

| | | | |
|---|---|---|---|
| 1,991,684 | 2/1935 | Ketel | 267/138 |
| 3,354,991 | 11/1967 | Kenworthy | 188/67 |
| 4,589,301 | 5/1986 | Griner | 188/67 |
| 4,978,133 | 12/1990 | Thorne et al. | 267/138 |
| 5,131,115 | 7/1992 | Sarto | 188/67 |

*Primary Examiner*—Matthew C. Graham
*Attorney, Agent, or Firm*—Ernest H. McCoy

[57] ABSTRACT

A dynamic motion limiter for supporting high temperature piping in nuclear power plants, the motion limiter including a cylinder and piston wherein the movement of the piston within the cylinder is limited with intermittent contact between energy absorbing stop positions.

3 Claims, 3 Drawing Sheets

DYNAMIC MOTION LIMITER

CROSS-REFERENCE TO RELATED APPLICATION

The present invention is related to the patent application for Seismic Stop Support filed Aug. 24, 1987, under Ser. No. 07/088,580 in Group Art Unit 314 (now abandoned).

BACKGROUND OF THE INVENTION

1. Field of the Invention

The present invention relates to snubbers for use on piping and components of power plants and processing facilities and, more particularly, to an improved seismic stop support which limits the dynamic motion of the supported structure.

2. Description of the Prior Art

During the 1970s, an increasing concern was expressed by the U.S. Atomic Energy Commission and the U.S. Nuclear Regulatory Commission personnel regarding the reliability and safety of nuclear power plant piping under severe dynamic loads caused by fluid transients or seismic activity. Attention was therefore directed to analyzing the design and safety of the piping and components, and extensive testing programs were undertaken.

Two conflicting requirements characterize the design of high temperature piping. First, in order to minimize thermal stresses, the pipe supports must permit pipe movement from rising thermal expansion to be relatively unrestrained. Second, in order to minimize dynamic stresses, the supports are required to restrain the dynamic motion of the pipe in the event of a dynamic excitation such as an earthquake. The need to resolve this conflict of function in the pipe supports led to the development of snubbers.

Snubbers permit pipe displacement resulting from slow movements, such as thermal expansion, but they restrain rapid motion, such as that induced by earthquakes. They are considered active supports because their performance is response dependent and rely on moving components or pressurized medium in the snubbers. The snubbers change function in response to dynamic motion excitation of thermal piping. The two basic types of snubbers are hydraulic and mechanical. Either type moves freely to accommodate thermal movement of piping and locks up if the piping or its components are subjected to rapid movement and high amplitudes caused by a seismic event or dynamic load such as water hammer.

The problems associated with the hydraulic and mechanical snubbers have been documented and set forth in a Nuclear Regulatory Commission circular entitled, Aging and Service Wear of Hydraulic and Mechanical Snubbers Used on Safety-Related Piping and Components of Nuclear Power Plants—Phase I Study—which is NUREC/CR-4279; PNL- 5479; Vol. 1 (RM, RV), prepared by S. H. Bush, P. G. Heasler, R. E. Dodge of the Pacific Northwest Laboratory, Richland, Wash. 99352, completed January, 1986, and published February, 1986. It was prepared for the Division of Engineering Technology, Office of Nuclear Regulatory Research, U.S. Nuclear Regulatory Commission, Washington, D.C. 20055, NRC FIN B2865. A copy of that circular is filed with the patent application for the present invention and made a part of the record hereof.

The goal of the seismic design procedures was to maintain piping frequencies sufficiently above the dominant excitation frequencies such that piping response was not significantly amplified. This can be readily accomplished by relying on snubbers to restrain the dynamic loads. The ease with which snubbers can be employed in analysis, and the demands of plant design and construction deadlines, have resulted in a proliferation of snubbers in nuclear power plant piping.

Although convenient for purposes of design and analysis, snubbers have many disadvantages that become apparent in the course of plant construction and operation. Both mechanical and hydraulic snubbers are sensitive devices that require special care in installation. Careless handling, forced alignment of the spherical bearings, and arc strikes from negligent welding have resulted in malfunctions. Problems arising from leaking fluid, degradation of seal material, and corrosion have necessitated frequent in-service inspection and testing at all nuclear power plants.

Because many snubbers are located in areas of high radiation, exposure of personnel to radiation during maintenance is of concern. Many recently built nuclear power plants use as many as 2,000 snubbers, costing anywhere from $1,000 to $15,000 each. Maintenance costs for a single snubber in the lifetime of a plant may reach $60,000. In view of these problems, considerable advantages in cost and reliability could be gained by eliminating or reducing the use of snubbers. However, some form of restraint is necessary to restrict large dynamic displacement and maintain piping stresses at acceptable levels. Any such restraints must be employed as easily as snubbers in the piping system design and analysis.

SUMMARY OF THE INVENTION

The present invention is a passive support system which for lack of a given name has been called a seismic stop support and which utilizes limit stops to support the thermal piping and are sized with adjustable gaps to allow for thermal expansion while preventing large dynamic motion. The idea of creating gap supports in the form of limit stops to restrict the dynamic motion of piping is not entirely new. The concept was successful in some fossil-fueled power plants. The concept utilized box frames constructed around the pipe as limit stops with substantial clearances of 2"–4" to permit thermal motion. By contemporary standards, this method of pipe support is quite primitive. However, in a fossil-fueled plant near Bakersfield, Calif., supports of this type completely protected hot, high pressure steam and feed water lines during the severe 1952 Tehachapi earthquake.

Piping that is dynamically restrained with limit stops is generally more flexible and has lower natural frequencies resulting from dynamic motion than piping protected by rigid or snubber supports. A flexible piping system will incur lower stresses from dynamic motion induced deflections, such as those from differential support or anchor displacement, than will a stiff system. The primary drawback to the employment of limit stops is the difficulty of obtaining analytical solutions from seismic motion analysis. Current linear dynamic analysis methods for nuclear power plant piping cannot be readily applied when gaps between the pipe and its support are used. In these circumstances, the analytical model for the piping system becomes non-linear because the restraint stiffness at the limit stop varies depending upon whether the pipe is in contact with the restraint. Direct integration of the equations of motion to solve non-linear problems of this type is time-consuming and prohibitively expensive. The recent development of an improved and simplified non-linear analysis method has established the usefulness of the present invention.

The dynamic motion limiter of the present invention provides a pipe support which is in effect a gap that restrains pipe motion between limits and causes intermittent contact of the pipe with the ends of the gap formed by the limit stops during dynamic excitation to prevent harmonic motion to build up in the pipe. It comprises a hollow body portion having two ends. Limit stops, including a compression stop and an extension stop, are secured internally of the body portion at opposite ends thereof and are adjustably disposed within the body portion whereby the distance between the stops can be varied between preselected limits. A means is provided for determining the positioning of the stops in the body portion by external inspection of the motion limiter. A piston is disposed in the hollow body portion between the stops and is free to reciprocate in the body portion between a cold thermal condition of the thermal piping to which the motion limiter is attached and a hot thermal condition of the piping. A shock absorber is engaged with the piston to absorb the shock of the piston hitting the limit stops as a result of dynamic motion exciting the thermal piping during a seismic event. The absorber has a variable stillness which can be preselected. A connector is secured to the piston and extends from the body portion. A first mount is secured to one end of the body portion, opposite from the end from which the connector extends, and a second mount is secured to the opposite end of the connector from the piston. The mounts are adapted for engaging thermal piping to a support anchor.

The device of the present invention is a passive pipe support which has been developed along with an economical approach to calculating seismic motion displacements and stresses in a piping system with limit stops by using an equivalent linear analysis technique. This analysis technique renders practical the utilization of the dynamic motion limiter of the present invention as a substitute for a snubber.

OBJECTS OF THE INVENTION

It is therefore an important object of the present invention to provide a passive pipe support which restricts the dynamic motion of nuclear power plant piping.

It is another object of the present invention to provide a passive pipe support and dynamic motion limiter which accommodates thermal expansion and motion of nuclear power plant piping and which in addition provides a means for measuring the actual thermal expansion of the piping during initial heat-up testing of the plant.

It is a further object of the present invention to provide a passive pipe support that will support piping such that it is generally more flexible and has lower natural frequencies than nuclear power plant piping protected by rigid or snubber supports.

It is also an object of the present invention to provide a passive pipe support that provides intermittent limits to the motion of the pipe during dynamic motion whereby the characteristics of the pipe motion will be randomly varied during seismic excitation thereby eliminating resonant dynamic forces.

It is still another object of the present invention to provide a dynamic motion limiter which is much less expensive than the present snubber systems and requires considerably less maintenance and no in-service testing, for large overall cost reductions, as compared with the present snubber devices.

And it is yet a further object of the present invention to provide a passive pipe support and dynamic motion limiter which can be easily installed to replace existing snubbers utilizing the existing attachment hardware and piping components and which does not require modification of existing structures.

Other objects of the present invention will become apparent when the preferred embodiment thereof is considered in conjunction with the accompanying drawings.

DESCRIPTION OF THE PREFERRED EMBODIMENT

Figure 1:
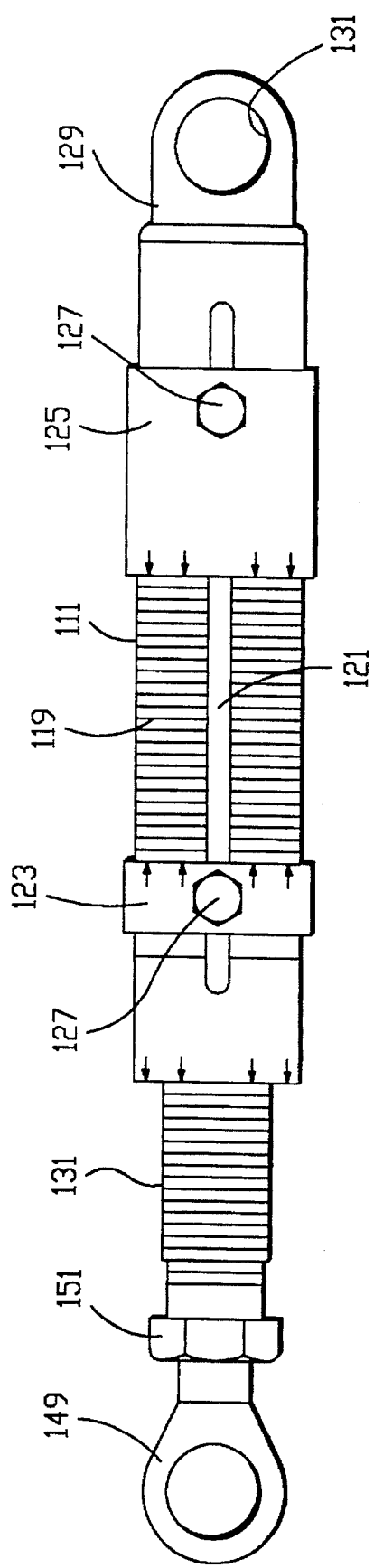
FIG. 1 is a side elevation of an alternative preferred embodiment of the motion limiter of the present invention.

The present invention is a passive pipe support and seismic stop in the form of a dynamic motion limiter. A first preferred embodiment illustrated in FIGS. 1 and 2 of the above-identified related application includes a hollow body portion in the form of a cylinder 11 which has an adjustable length internal cavity 13. This is accomplished by having inner and outer opposed hollow cylindrical halves 15, 17 which are engaged in a male-female sliding relation. The sliding relation is accomplished in the preferred embodiment by providing external threads 19 on the male member and internal threads 21 on the female member and threadably engaging the two halves of the cylinder. The cylinder also includes locking means for fixing the length of the internal cavity at predetermined sizes. This is accomplished by set screws 23 which project through the outer cylindrical half to engage the internal male member. A plurality of such set screws are disposed around the periphery of the outer cylinder half.

A piston 25 is disposed in the cavity formed by the cylinder halves and projects from the body portion by means of a connector through a hole 27 in the end of the outer cylinder half. The guide portion 29 of the piston reciprocates in the internal cylindrical section of the internal cylindrical half. The piston is provided with energy absorbing flanges 31 called impact plates which are mounted on the piston and which limit the longitudinal reciprocating travel of the piston in the cavity 13. The energy absorbing flanges, or impact plates, are in the form of washers which are mounted on the pistons and are free to move between a first pair of spaced stops 33 formed on the piston. The stops formed on the piston are a pair of shoulders 33 at opposite ends of a reduced diameter center section 35 of the piston.

The piston 25 is formed in two pieces which are threadably engaged. Each of the pieces has a shoulder 33 formed thereon and the threaded adjustment of the female piston piece 37 onto the male piston pieces 39 sets the distance between the shoulders. The shoulder of the female piece is simply the abutting end thereof while the shoulder on the male piece is disposed in spaced relation to the abutting end of the female piece along the guide end 29 of the piston. The piston is free to reciprocate in the cylindrical body portion between a cold thermal condition of the thermal piping to which the piston is attached and a hot thermal condition of the piping.

The energy absorbing metals, a seismic shock absorber, includes a spring means disposed between the impact plates 31 urging them apart against the shoulders 33 on the piston. In the preferred embodiment, the spring means is a multiple set of Belleville springs 41. Adjustment of the female piston piece 37 on the male piece 39 by the threaded engagement can vary the distance between the shoulders, but usually the distance is predetermined based on the spring means selected for the application and the desired spring preloading.

During assembly the female portion 37 of the piston 25 can be screwed onto the male connector portion 39 to move together or separate the impact plates 31 thereby increasing or decreasing the pressure on the springs 41 disposed therebetween to preload them. The spring characteristics are selected in response to the required design stiffness so that a constant stiffness value is maintained within the rated capacity of the support during a seismic event. This constant pre-determined stiffness is an important feature of the present invention not obtainable from the prior art snubbers or box frames constructed around piping.

The threaded connection between the inner and outer cylinders 15, 17 also permits the length of the space within which the piston 25 can reciprocate to be varied. A second set of stops 47, a compression stop and an extension stop, which are adjustable, are provided inside the cylinder for the impact plates 31 to contact: one is the end of the cylinder inside the female cylinder half while the other is the abutting end of the male cylinder half. Because the stops are adjustably disposed within the cylindrical body portion, the distance between the stops can be varied between preselected limits.

In operative position, the impact plates 31 will be retracted to one end of the cylinder when the piping is at rest or cold. The piston 25 will then move the impact plates to the other end of the cavity 13 as the thermal expansion of the pipes takes place. The length of the internal cavity is adjusted so that when the pipes are cold, the impact plates are disposed against a compression stop at one end of the cylinder and when complete thermal expansion of the pipe occurs, the impact plates will be bearing against the extension stop at the other end of the cavity. The adjustability of the length of the internal cavity permits precise boundaries of pipe movement to be established at the two ends of the range of thermal pipe expansion. This capability is not obtainable from the prior art of snubbers and box frames constructed around piping and is an important feature of the present invention.

A means is provided for determining the positioning of the limit stops in the hollow body portion 11. For this purpose, the external surface of the inner cylinder 15 can be inscribed or provided with indicia 49 measured against the end of the outer cylinder half 17 for the purpose of accurately setting or resetting the total length of the internal cavity of the hollow body portion. Corresponding indicia are inscribed on the outer surface of the male piston piece 39 to indicate the relative position of the piston, and hence the impact plates 31, within the internal cavity 13 and relative to the stops 47. Thus, the present invention also provides a means for measuring the actual thermal expansion of the pipe during initial heat-up testing of nuclear power plants.

Means in the form of mounts are disposed at the free ends of the cylinder and the piston connector 39 for interconnecting the motion limiter between a support anchor, such as a wall or stanchion, and the supported structure which, in most cases, is a pipe. In the preferred embodiment, one end of the cylinder is provided with a first mount which includes a spherical bearing end connector 43. The free end or connector portion of the piston 39, which is the male portion, includes internal threads 45 for engaging or for creating the interface for an external or second mount or connectors. The mounts are adapted for engaging thermal piping to a support anchor, and the length of the motion limiter can be varied due to the adjustable engagement of the second pivot mount to the piston tube.

In the event of a seismic event, the piston is free to reciprocate between the limit stops 47 which are set at the ends of the range of thermal expansion by the internal cavity length and the impacts at the ends of travel are cushioned with a preselected spring stiffness by the seismic shock absorber. As a result of the free motion of the piston, the dynamic motion of the supported pipe is only intermittently restrained when the piston hits the stops whereby any resonant motion of the pipe is interrupted.

Figure 2:
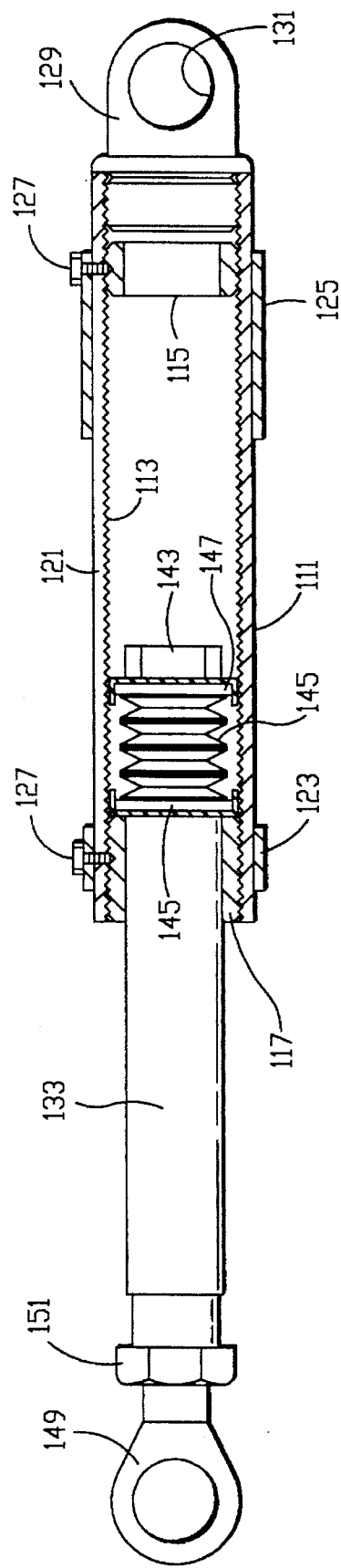
FIG. 2 is a side elevation in partial cross-section of the alternative preferred embodiment of the motion limiter in extended position.
Figure 3:
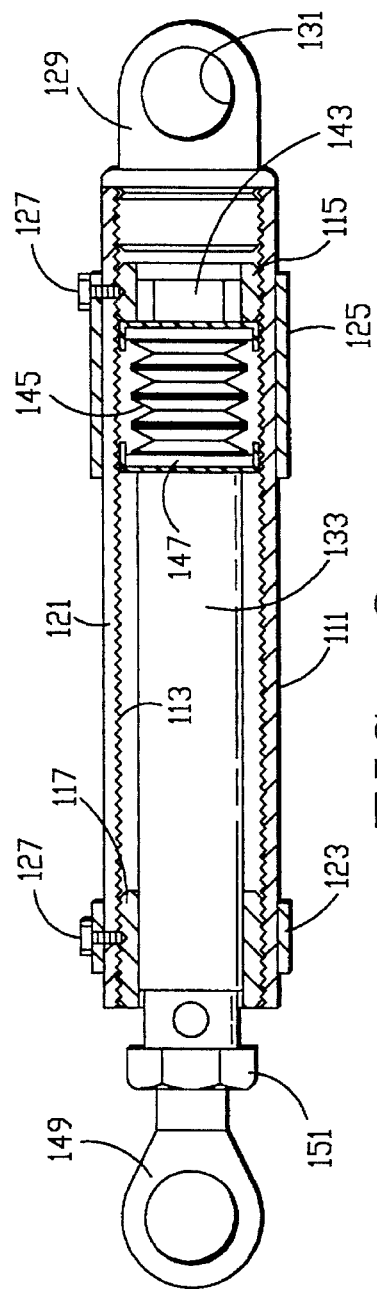
FIG. 3 is the alternative view of FIG. 4 with the motion limiter in compressed position.
Figure 4:
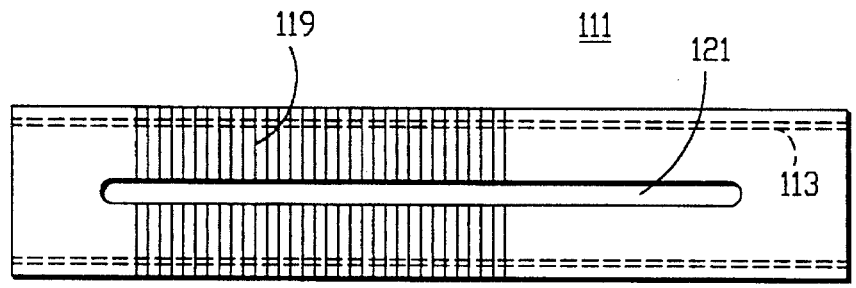
FIG. 4 is a side elevation showing the cylindrical body of the preferred alternative embodiment.
Figure 5:
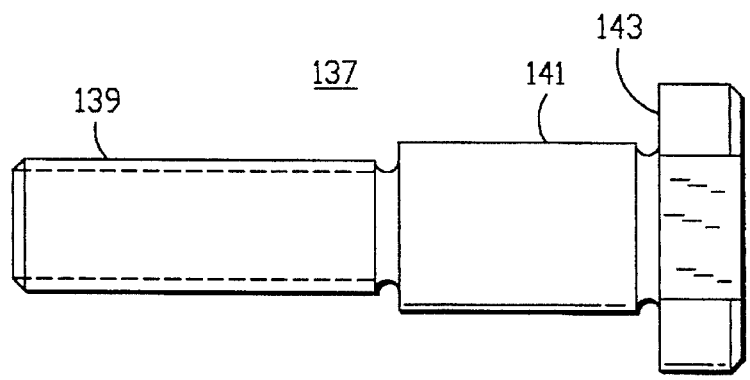
FIG. 5 is the spring guide screw of the preferred alternative embodiment.
Figure 6:
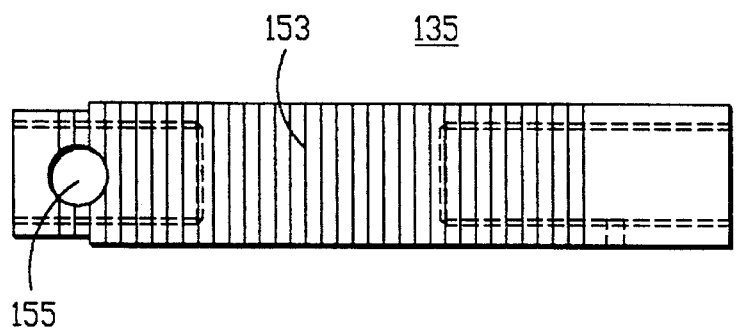
FIG. 6 is the piston rod tube of the preferred alternative embodiment in side elevation.

Reference is made to FIGS. 1–6 of the present invention which illustrate an alternative preferred embodiment of a simplified seismic stop support or dynamic motion limiter of the present invention. The FIGS. 4–6 are not in proportion. The left end of the element of FIG. 5 threadably engages the right end of the clement of FIG. 6, and the assembly of elements of FIGS. 5 and 6 in operative condition are disposed inside the element of FIG. 4.

The seismic stop of FIGS. 1–6 operates in the same manner as the first preferred embodiment but is of simpler construction and therefore less costly to manufacture. It is comprised of a hollow cylindrical body portion 111, illustrated in FIG. 4, having internal threads 113 formed therein at least at the ends thereof. For simplicity of manufacture, they extend for substantially the length thereof.

A pair of limit stops, a compression stop 115 and an extension stop 117, FIGS. 2 & 3, are secured internally of the body portion at opposite ends thereof. The stops are adjustably disposed within and threadably engaged in opposite ends of the body portion whereby the distance between the stops can be varied between preselected limits. The stops are cylindrical rings having external threads formed thereon for engaging the internal threads of the body portion at adjustable positions within the length thereof.

A means is provided for determining the internal positioning of the limit stops 115, 117 within the body portion by external inspection of the stop. The means includes indicia 119 which are inscribed on the external surface of the cylindrical body for at least a portion of the length thereof for determining internal locations therein. See FIG. 1. A slot 121 is formed in the cylindrical body and also extends for a portion of the length thereof. See FIGS. 1 & 4. It does not extend to the ends of the cylinder so that the body portion retains mechanical integrity. This slot permits internal inspection of the motion limiter assembly, which is an important feature of the invention, as well as interconnection of some of the elements to be described hereinafter.

A pair of indicators 123, 125 in the form of rings are arranged to slidably engage the external surface of the body portion 111. See FIGS. 1–3. Alternatively, the indicators can be sliders, such as a short bar having a T cross-section with the base of the T section aligned in the slot in the cylindrical body. The indicators are disposed at opposite ends of the body and are engaged with the respective internal stops 115, 117 to indicate the internal location or positioning of the stops in the body portion. The internal locations are identified by the positioning of the indicators with respect to the indicia 119 which is inscribed on the cylindrical body.

The means by which the indicators 123, 125 are engaged with the internal stops 115, 117 includes set screws 127 which threadably interlock the indicators to the stops. See FIGS. 1–3. The stops are provided with a pair of set screw receptacles disposed on circumference of the stops which when aligned with the slot 121 permit the set screws in the indicators to extend through the slot in the body portion and engage one of the receptacles in the stops and interlock the indicators to the stops to fix their location in the cylindrical body. The set screws prevent the stops from rotating and moving.

A pivot mount 129 having threads disposed at one end thereof is threadably engaged into one end of the cylindrical body portion 111. The other end of the pivot mount forms a spherical bearing 131 for attaching the motion limiter to another structure.

A piston 133 is provided which is disposed in and formed for reciprocating internally of the hollow cylindrical body portion 111. See FIGS. 1–3. The piston projects out of the opposite end of the body portion from the pivot mount 129, and the external surface of the piston fits closely within the surrounding extension stop 117. The stroke of the piston (which can be varied by moving the stops) can be determined by simply measuring the difference in length of the portion of the piston which projects out of the cylindrical body when the piston is moved between the two positions: extended and compressed. To make this determination easier, the piston also may have indicia 153 inscribed on the external surface thereof for at least a portion of its length (not shown in FIGS. 2 & 3). The indicia on the piston is measured against the end of the body portion.

The piston 133 is comprised of five parts. The body of the piston, the piston tube, which is illustrated in FIG. 6, is a hollow generally cylindrical tube 135 having threads formed internally at each end thereof. A spring guide screw 137, illustrated in FIG. 5, having threads formed at one end thereof 139, is threadably engaged into one end of the tube 135. A spring mount surface 141 is formed at the other end of the spring guide screw from the threaded end and terminates at the end of the guide in an abutment stop 143 for containing the spring means 145 on the spring mount surface 141.

A pair of spring retainers 147 are mounted on the spring guide screwy 137 at opposite ends of the spring mount surface 141 between the abutment stop and the adjacent end of the piston tube. In operation, it has been found advantageous to form the spring retainers 147 as cups to prevent hangup of the operation of the piston. The cup configuration prevents the retainers from catching on the internal threads 113 of the body portion 111 when the piston 133 is reciprocating inside the body portion between the stops 115, 117. The problem could also be eliminated by making the interior of the body portion between the stops a smooth bore. The Belleville disc springs are mounted on the spring mount surface between the spring retainers 147.

A pivot mount 149 in the form of an eyebolt is adjustably threadably engaged in the opposite end of the tube 135 from the spring guide screw 137 and secured in position by a lock nut 151. A hole 155 is provided as an inspection port to verify proper engagement between the piston and the eyebolt.

The devices of the present invention can be easily retro fitted into existing nuclear power plants to replace snubbers.

The passive dynamic motion limiter described herein can make use of existing attachment hardware and piping components and do not require modification of existing structures. The present invention accommodates thermal expression of the piping and yet restricts dynamic motion of nuclear power plant piping. It protects the high temperature piping from excessive stress due to dynamic motion by providing intermittent support to the pipe which results in incoherent dynamic response. This is a different and improved means than is available from the prior art and is much less expensive to manufacture than present snubber systems and requires no in service testing and essentially no periodic maintenance for large overall cost reductions as compared with the present snubber devices.

Thus, it will be seen from this description of the preferred embodiment that all of the objects and advantages of the present improved invention are achieved. While the preferred embodiment of the invention has been described in considerable detail herein, the invention is not to be limited to such details as have been set forth except as may be necessitated by the appended claims.

I claim:

1. A dynamic motion limiter for engaging thermal piping to a structure anchor comprising a hollow body portion having internal threads formed therein at least at the opposite ends thereof, a compression stop and an extension stop in the form of cylindrical rings having external threads formed thereon for engaging the internal threads of said body portion, said stops being threadably engaged in opposite ends thereof, means for determining the positioning of said stops in said body portion, a first pivot mount secured to one end of said cylindrical body portion, and a piston disposed in and formed for reciprocating internally of said body portion, said piston comprised of a piston tube having threads formed internally at least at one end thereof, said piston tube projecting out of the opposite end of said body portion from said pivot mount and closely fitting within said extension stop, a spring guide screw having threads formed at one end thereof threadably engaged into a threaded end of said piston tube, said spring guide screw having a spring mount surface formed at the other end thereof, said spring mount surface terminating at the unthreaded end of the spring guide screw in an abutment stop, spring retainers mounted on said spring guide screw at opposite ends of said spring mount surface between said abutment stop and the adjacent end of said piston tube, spring means mounted on said spring mount surface between said spring retainers, said spring means having a variable stiffness which can be preselected, and a second pivot mount adjustably engaged to the opposite end of said piston tube from said spring guide screw, said mounts adapted for engaging thermal piping to a support anchor.

2. The dynamic motion limiter of claim 1 wherein said means for determining the positioning of said limit stops in said body portion is comprised of indicia inscribed on the external surface of said body portion for at least a portion of the length thereof relative to internal locations therein, and a pair of indicators formed to slidably engage the external surface of said body portion and being disposed at opposite ends thereof and engaged with the respective stops to indicate the internal position of said stops in said body portion as indicated by the positioning of said indicators with respect to said indicia inscribed on said body portion.

3. A dynamic motion limiter for engaging thermal piping to a structure anchor comprising a hollow cylindrical body portion having internal threads formed therein at least at the opposite ends thereof, indicia inscribed on the external surface of said cylindrical body for at least a portion of the length thereof relative to internal locations therein, a slot formed in said cylindrical body and extending for a portion of the length thereof, a compression stop and an extension stop in the form of cylindrical rings having external threads formed thereon for engaging the internal threads of said cylindrical body, said stops being threadably engaged in opposite ends thereof, a pair of indicators formed to slidably engage the external surface of said cylindrical body and being disposed at opposite ends thereof and engaged with the respective stops by set screws which are threadably engaged with said indicators and extend through said slot in said cylindrical body and engage the respective stops to interlock the indicators to the stops and indicate the internal position of said stops in said body portion as determined by the positioning of said indicators with respect to said indicia inscribed on said body portion, a first pivot mount having threads formed on one end thereof which are threadably engaged into one end of said cylindrical body, and a piston disposed in and formed for reciprocating internally of said cylindrical body portion, said piston projecting out of the opposite end of said cylindrical body from said pivot mount and closely fitting within said extension stop, said piston being comprised of a generally cylindrical piston tube having threads formed internally at each end thereof, a spring guide screw having threads formed at one end thereof threadably engaged into one end of said piston tube, said spring guide screw having a spring mount surface formed at the other end thereof, said spring mount surface terminating at the unthreaded end of the guide screw in an abutment stop, a pair of spring retainers mounted on said spring guide screw at opposite ends of said spring mount surface between said abutment stop and the adjacent end of said piston tube, said retainers being adjustable along said spring mount surface, exchangeable disc springs mounted on said spring mount surface between said retainers, the preloading of the disc springs assembly being variable to a preselected value by adjustment of the positioning of said spring retainers by tightening or loosening the spring guide screw in the piston tube, and a second pivot mount adjustably threadably engaged in the opposite end of said piston tube from said spring guide screw, said mounts adapted for engaging thermal piping to a support anchor.

* * * * *